(12) United States Patent
Potdar et al.

(10) Patent No.: US 11,421,773 B1
(45) Date of Patent: Aug. 23, 2022

(54) VEHICLE DRIVETRAIN LUBRICATION SYSTEM

(71) Applicants: Saurabh H Potdar, Troy, MI (US); Christopher S Barron, Royal Oak, MI (US); Halim Santoso, Novi, MI (US)

(72) Inventors: Saurabh H Potdar, Troy, MI (US); Christopher S Barron, Royal Oak, MI (US); Halim Santoso, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 13 days.

(21) Appl. No.: 17/175,821

(22) Filed: Feb. 15, 2021

(51) Int. Cl.
  *F16H 57/04* (2010.01)

(52) U.S. Cl.
  CPC ..... *F16H 57/0423* (2013.01); *F16H 57/0465* (2013.01); *F16H 57/0483* (2013.01)

(58) Field of Classification Search
  CPC ............ F16H 57/0423; F16H 57/0465; F16H 57/0483
  See application file for complete search history.

(56) References Cited

U.S. PATENT DOCUMENTS

| | | | | |
|---|---|---|---|---|
| 5,259,194 A | * | 11/1993 | Okada | F16H 57/027 475/83 |
| 5,643,127 A | * | 7/1997 | Yoshii | F16H 57/045 184/6.12 |
| 6,997,284 B1 | * | 2/2006 | Nahrwold | F16H 57/0483 165/47 |
| 8,746,405 B2 | | 6/2014 | Perakes et al. | |
| 10,279,625 B2 | | 5/2019 | Kelly et al. | |
| 2012/0172167 A1 | * | 7/2012 | Myers | F16H 57/0457 475/160 |
| 2019/0170243 A1 | | 6/2019 | Brizendine et al. | |

FOREIGN PATENT DOCUMENTS

| | | |
|---|---|---|
| EP | 1918613 B1 | 1/2010 |
| EP | 2988028 B1 | 7/2020 |

\* cited by examiner

*Primary Examiner* — Colby M Hansen
(74) *Attorney, Agent, or Firm* — Ralph E. Smith

(57) ABSTRACT

In at least some implementations, a vehicle drivetrain assembly includes a housing, a reservoir and a conduit. The housing has a housing interior, a housing inlet communicating with the housing interior, a housing outlet communicating with the housing interior, and an opening communicating with the housing interior and adapted to receive part of a shaft. The reservoir is carried by the housing and has a reservoir interior, a reservoir inlet communicating with the reservoir interior, and at least one reservoir outlet communicating with the reservoir interior. The conduit is coupled at a first end to the housing outlet and coupled at a second end to the reservoir inlet, wherein at least part of the conduit extends above the housing interior relative to gravity, and the conduit is routed about an exterior of the housing.

18 Claims, 3 Drawing Sheets

VEHICLE DRIVETRAIN LUBRICATION SYSTEM

FIELD

The present disclosure relates to a lubrication system for vehicle drivetrain components.

BACKGROUND

Some vehicle drivetrain assemblies include shafts coupled by gears received within a housing. Lubricant is provided within the housing for seals, bearings and the gears. The lubricant creates resistance to rotation of the shafts and gears, especially at higher rotary speeds, and can reduce the energy efficiency of the vehicle.

SUMMARY

In at least some implementations, a vehicle drivetrain assembly includes a housing, a reservoir and a conduit. The housing has a housing interior, a housing inlet communicating with the housing interior, a housing outlet communicating with the housing interior, and an opening communicating with the housing interior and adapted to receive part of a shaft. The reservoir is carried by the housing and has a reservoir interior, a reservoir inlet communicating with the reservoir interior, and at least one reservoir outlet communicating with the reservoir interior. The conduit is coupled at a first end to the housing outlet and coupled at a second end to the reservoir inlet, wherein at least part of the conduit extends above the housing interior relative to gravity, and the conduit is routed about an exterior of the housing.

In at least some implementations, the housing outlet extends from a first end to a second end at an angle of between 20 degrees and 90 degrees relative to an axis of the opening.

In at least some implementations, the housing outlet has a first end that is open to the housing interior and a second end, the first end is between the housing interior and the second end, and the first end is below the second end relative to gravity when the housing is in an orientation of its intended use. The housing outlet may be located above an axis of the opening when the housing is in an orientation of its intended use and relative to gravity.

In at least some implementations, the housing includes a base in which the opening is formed and a cover coupled to the base, with the base and cover both defining part of the housing interior, and wherein the housing outlet is defined in the cover.

In at least some implementations, the at least one reservoir outlet includes a first outlet formed in a bottom of the reservoir, and a second outlet located above the bottom of the reservoir, and wherein a flow area of the second outlet is greater than a flow area of the first outlet. The reservoir interior may be located above at least part of the housing interior relative to gravity when the housing is in an orientation of its intended use.

In at least some implementations, the reservoir inlet is located above said at least one reservoir outlet relative to gravity when the housing is in an orientation of its intended use.

In at least some implementations, a vehicle drivetrain assembly, includes a housing, a reservoir, a conduit, and a ring gear. The housing has a housing interior part of which defines a lubricant bath in which lubricant is received, a housing inlet communicating with the housing interior, a housing outlet communicating with the housing interior, a first opening communicating with the housing interior and having a first axis, a second opening communicating with the housing interior and having a second axis, and a third opening communicating with the housing interior and being coaxial with the second opening. The reservoir is carried by the housing and has a reservoir interior, a reservoir inlet communicating with the reservoir interior, and at least one reservoir outlet communicating with the reservoir interior. The conduit is coupled at a first end to the housing outlet and coupled at a second end to the reservoir inlet, wherein at least part of the conduit extends above the housing interior relative to gravity, and the conduit is routed about an exterior of the housing. And the ring gear is received within the housing interior for rotation relative to the housing. The ring gear is arranged so that part of the ring gear is within the lubricant bath and lubricant is displaced by the ring gear as the ring gear rotates relative to the housing and at least some of the displaced lubricant is routed from the housing interior to the reservoir interior through the lubricant conduit.

In at least some implementations, the housing outlet extends from a first end to a second end at an angle of between 20 degrees and 90 degrees relative to the first axis, and the first end is open to the housing interior and the second end, the first end is between the housing interior and the second end, and the first end is below the second end relative to gravity when the housing is in an orientation of its intended use. The housing outlet may be located above an axis of the first opening when the housing is in an orientation of its intended use and relative to gravity.

In at least some implementations, the housing includes a base in which the first opening, second opening and third opening are formed and a cover coupled to the base, with the base and cover both defining part of the housing interior, and wherein the housing outlet is defined in the cover.

In at least some implementations, the at least one reservoir outlet includes a first outlet formed in a bottom of the reservoir, and a second outlet located above the bottom of the reservoir, and wherein a flow area of the second outlet is greater than a flow area of the first outlet. The reservoir interior may be located above at least part of the housing interior relative to gravity when the housing is in an orientation of its intended use.

In at least some implementations, the reservoir inlet is located above said at least one reservoir outlet relative to gravity when the housing is in an orientation of its intended use. In at least some implementations, an acute included angle is defined between: 1) a centerline of a passage between the first end and second end of the outlet; and 2) a radius extending from the second axis and intersecting the centerline at the first end of the outlet. In at least some implementations, an imaginary plane drawn perpendicular to the second axis intersects both a portion of a periphery of the ring gear and the housing outlet. And in at least some implementations, a flow area of the first end of the housing outlet is greater than a flow area of the second end of the housing outlet.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
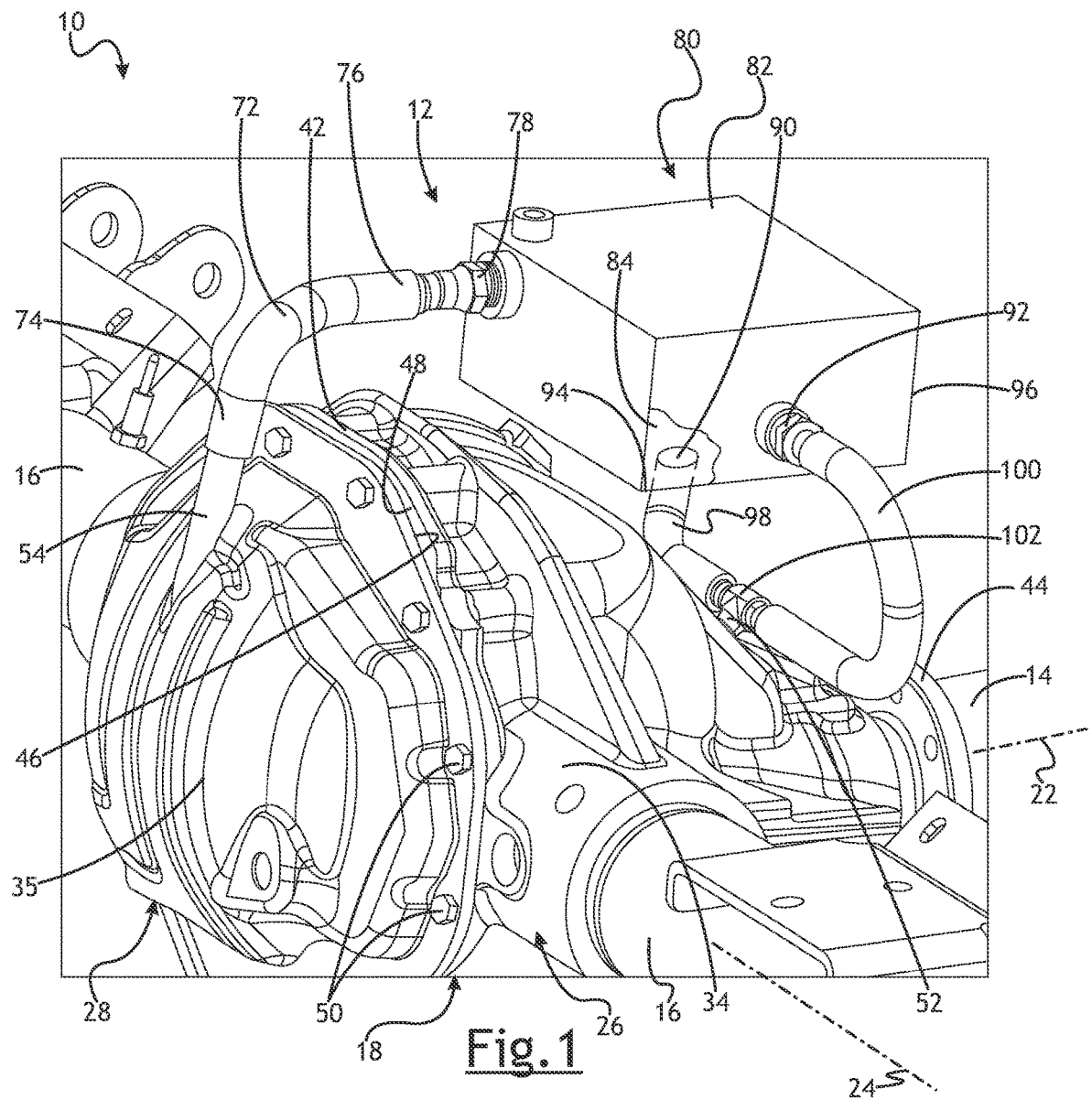
FIG. 1 is a perspective view of a drivetrain assembly having a housing and reservoir for lubrication of components in the assembly.
Figure 4:
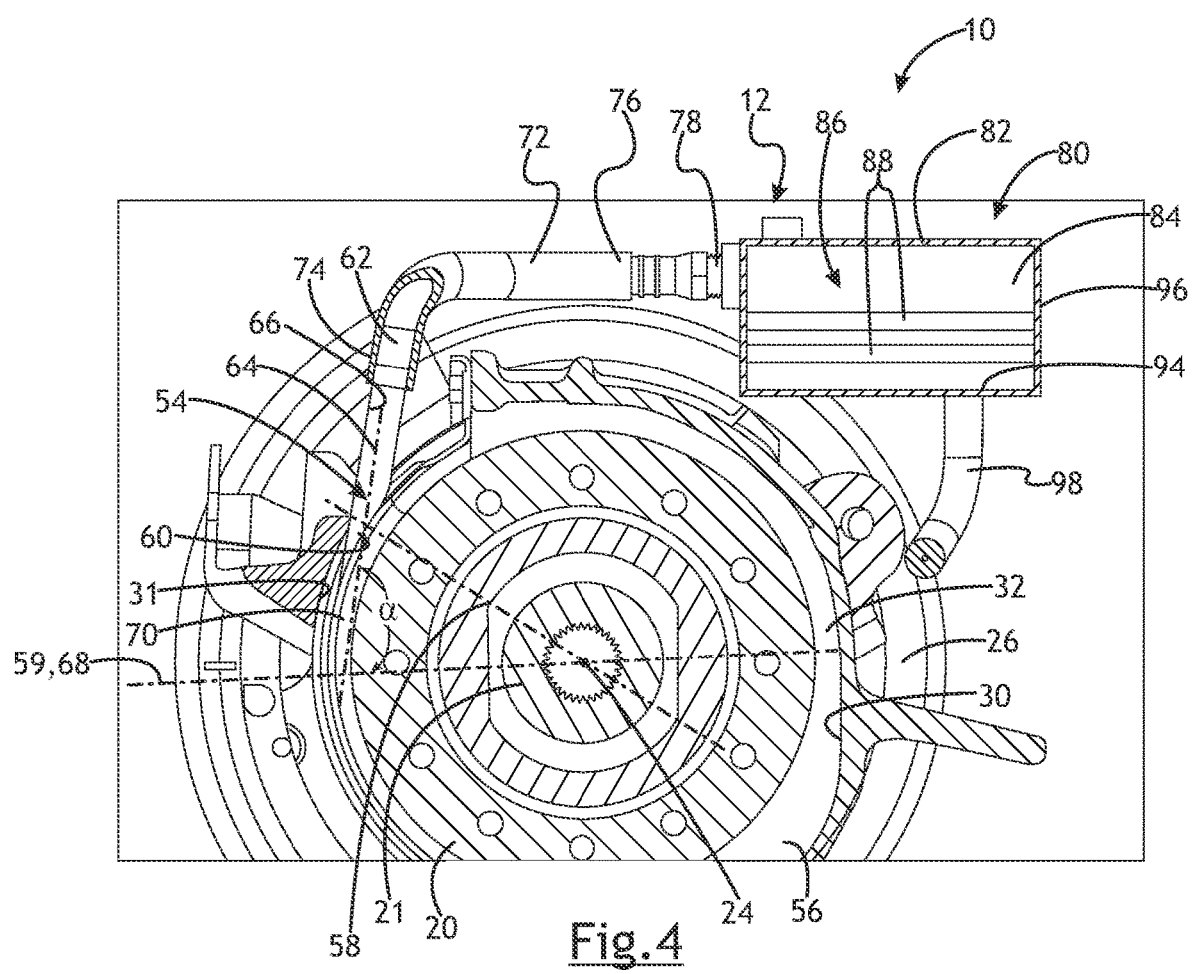
FIG. 4 is a cross-sectional view of the drive train assembly.

Referring in more detail to the drawings, FIG. 1 shows a drivetrain assembly 10 having a lubrication system 12. The drivetrain assembly 10 has an input or drive shaft 14, an axle or side shafts 16 and one or more gears that are received at least partially within a housing 18. As shown in FIG. 4, the gears may include a ring gear 20 and differential gears 21 that transmit rotary motion from the drive shaft 14, which rotates about a first axis 22 (labeled in FIG. 1), to one or more shafts (e.g. side shafts 16) rotating about a second axis 24 (the ring gear may be coaxial with the side shafts and also rotate about the second axis). Additionally, the drive shaft 14 and side shafts 16 may be journaled for rotation by one or more bearings carried by the housing 18. Lubricant may be contained within the housing 18 to lubricate the gears and bearings, and also seals that are provided around openings in the housing 18 from which the drive shaft 14 and/or other shafts may extend.

Figure 2:
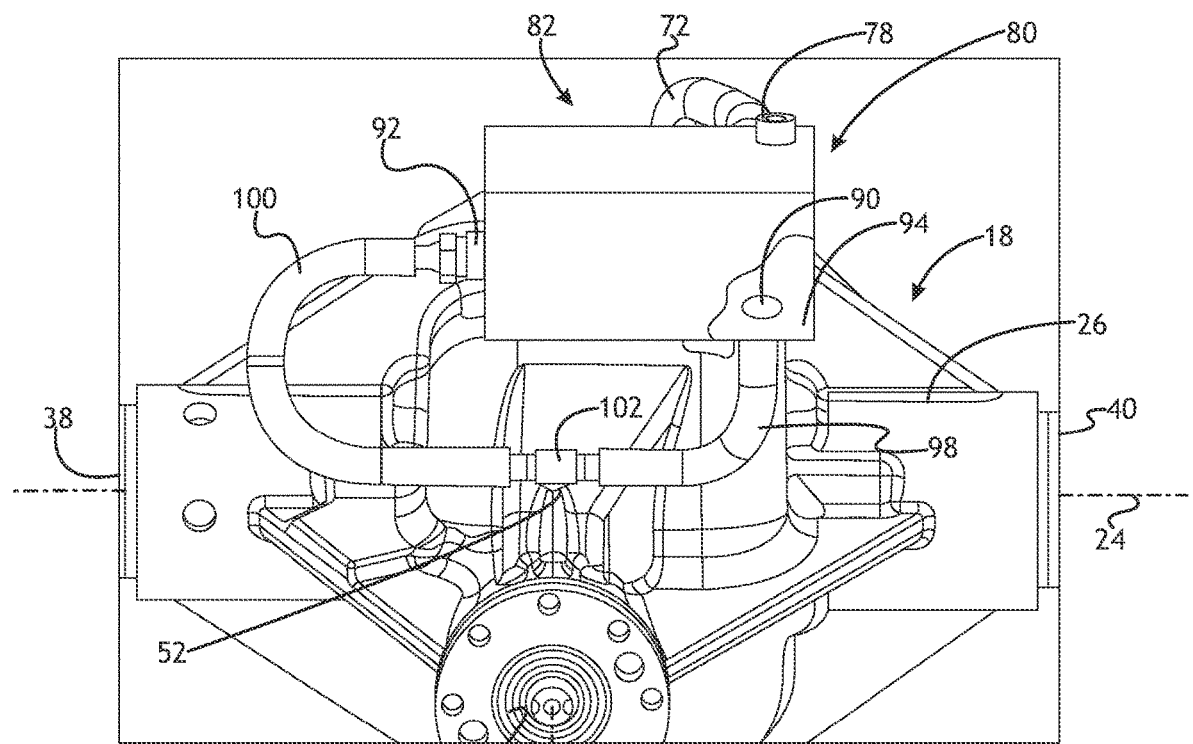
FIG. 2 is another perspective view of the drivetrain assembly.

In more detail, the housing 18 may include a first portion, sometimes called a base 26, coupled to a second portion, sometimes called a cover 28. The base 26 and cover 28 may be formed from any suitable material(s), such as cast metal or a polymeric or composite material. When assembled together, inner surfaces 30, 31 (FIG. 4) of the base 26 and cover 28 defining at least part of a housing interior 32 and outer surfaces 34, 35 of the base 26 and cover 28 defining at least part of an exterior of the housing 18 which may be open to the surrounding environment. The housing 18 may include or define multiple openings, such as a first opening 36 (FIG. 2) to receive an end of the drive shaft 14, and second and third openings 38, 40 through which an end of the side shafts 16 extend into the housing interior 32 and to be coupled to the gears within the housing interior 32. These openings 36, 38, 40 may be coaxial with the shafts 14, 16 that extend through them. In at least some implementations, including that shown in FIG. 1, the openings 36, 38, 40 may be defined in the base 26, and the cover 28 may be provided over an open end 42 of the base 26, that may be opposite to an end 44 of the base 26 from which the drive shaft 14 extends, but without the drive shaft 14 or any shaft extending through the cover 28. Of course, other constructions are possible.

The cover 28 and base 26 may include opposed mounting surfaces 46, 48 that are radially offset from and may be parallel to the second axis 24. Multiple fasteners 50 may be used to connect the cover 28 and base 26, and a gasket may be provided between the mounting surfaces 46, 48 to provide a liquid-tight seal between them. Further, the housing 18 has one or more inlets 52 open to or otherwise communicating with the interior 32 and through which lubricant enters the housing 18. And the housing 18 has one or more outlets 54 open to, or otherwise communicating with, the interior 32 and through which lubricant exits the housing 18, as will be described in more detail below. In at least some implementations, the outlet(s) 54 is/are provided in the cover 28 and the inlet(s) 52 is/are provided in the base 26, although other arrangements may be used.

The ring gear 20 and pinion gear(s) may be received entirely within the housing interior 32, and they are driven for rotation relative to the housing 18, which may be fixed in position relative to the vehicle. To accommodate part of the ring gear 20, at least part of the inner surface 31 of the cover 28 may be generally concave. A lubricant bath 56 (FIG. 4) in which a pool of lubricant exists is defined in a lower portion of the housing 18, and the ring gear 20 may be partially submerged in lubricant within the lubricant bath 56. The lubricant bath 56 has a maximum volume when the vehicle is at rest and all lubricant is within the housing interior 32. As the ring gear 20 rotates, some lubricant is moved out of the lubricant bath 56 and may be thrown outwardly toward the inner surfaces 31 of the cover.

Figure 3:
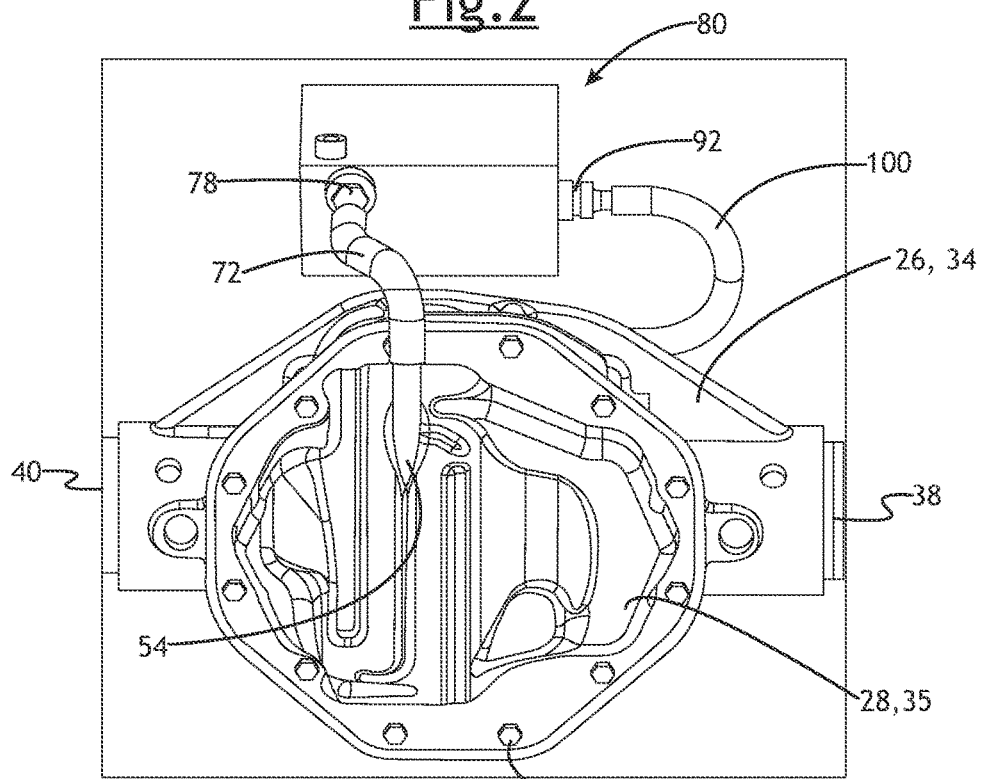
FIG. 3 is another perspective view of the drivetrain assembly.

Some of the displaced lubricant is directed to the outlet 54 (an implementation with a single outlet 54 is described further, but more outlets could be used, if desired), which is open to the housing interior 32 and oriented relative to the ring gear 20 to be in the path of a desired amount of lubricant displaced by the ring gear 20. For example, the ring gear 20 rotates about an axis (which may be the second axis 24) and the outlet 54 may be radially aligned with the ring gear 20. Stated differently, an imaginary plane 58 (FIGS. 3 and 4) drawn perpendicular to the axis 24 may intersect both a portion of the ring gear 20 periphery and the outlet 54. Further, the outlet 54 may be located at or above, relative to gravity, the height or level of the ring gear axis 24. Stated differently, an imaginary plane 59 that includes the ring gear axis 24 and which is oriented perpendicular to the direction of gravity would intersect or be below the outlet 54. Thus, at least some lubricant thrown radially outwardly by the ring gear 20 may be directed into and through the outlet 54.

Further, the outlet 54 may be oriented upwardly, relative to the force of gravity, wherein upwardly includes the direction opposite to gravity and less than 90 degrees from the direction opposite to gravity. As shown in FIG. 4, a first end 60 of the outlet 54, that is closest to the ring gear 20, may be lower than a second end 62 of the outlet 54 that is farthest from the ring gear 20. So arranged, a centerline 64 of a passage 66 defined by the outlet 54 may be oriented at an angle to the first axis 22 (or plane 59) of between 20 and 90 degrees, in at least some implementations, and may be between 45 and 90 degrees. In the example shown, an acute included angle α is defined between a radius 68 (coincident with plane 59 in FIG. 4) extending from the ring gear axis 24 perpendicular to gravity and intersecting the passage centerline 64. In at least some implementations, the passage 66 (e.g. centerline 64) may be tangential or within 10 degrees of tangential with respect to an annular gap 70 defined between the cover 28 and the periphery of the ring gear 20. Thus, lubricant displaced by the ring gear at an angle complementary to or sufficiently complementary to the orientation of the outlet 54 is routed into and through the outlet 54. Further, the first end 60 of the outlet 54 may have a greater cross-sectional flow area (the area of the opening defined at the first end 60 of the outlet) than does the outlet at the second end 62. This may facilitate collection of lubricant and directing and routing the lubricant toward the second end 62.

Such lubricant may exit the housing interior 32 via the outlet 54 and enter a lubricant conduit 72 that is connected at a first end 74 to the housing 18, generally at the second end 62 of the outlet, and at a second end 76 to an inlet 78 of a reservoir 80. The conduit 72 may be a tubular component formed separately from the cover 28 and base 26, and may extend about a portion of the exterior of the housing 18. The conduit 72 may be formed from any suitable material to route the lubricant from the housing 18 to the reservoir 80, such as metal, plastic or composite materials. In at least some implementations, a portion of the conduit 72 is located above the housing 18, for example, above a highest point of the housing interior 32 (relative to gravity) in the installed position of the housing 18.

In at least some implementations, the reservoir 80 may be carried by the base 26. For example, part of the reservoir 80, such as a reservoir body 82, may be connected to the housing base 26, and could be defined in the same piece or material as the housing base 26, if desired. The reservoir 80 may include a cover 28 that, with the reservoir body 82, defines an interior 84 of the reservoir 80. The reservoir interior 84 may be empty, or the reservoir 80 may include a heat exchanger 86 of any desired construction. In at least some implementations, the reservoir 80 includes a heat exchanger 86 including one or more tubes 88 through which a coolant is routed. An exterior of the tubes 88 is contacted by lubricant that enters the reservoir 80, or by air within the reservoir 80, and heat from the lubricant may be transferred to the tubes 88 and then to the coolant flowing through the tubes 88.

Lubricant enters the reservoir interior 84 through the reservoir inlet 78, and lubricant exits the reservoir 80, under the force of gravity and/or forces caused by vehicle movement, through one or more reservoir outlets. In the example shown in the drawings, two reservoir outlets 90, 92 are shown. Relative to gravity, the reservoir inlet 78 may open into the interior 84 at a height above at least one and up to all of the reservoir outlets 90, 92. The reservoir outlets 90, 92 each communicate with one or more of the housing inlets 52. In the example shown, the reservoir 80 has a first outlet 90 that is provided in a bottom 94 of the reservoir 80 and a second outlet 92 that is located spaced from the bottom 94, such as in a sidewall 96 of the reservoir 80. A first outlet conduit 98 may be connected to the reservoir 80 at the first outlet 90 and to the housing inlet 52. A second outlet conduit 100 may be connected to the reservoir 80 at the second outlet 92 and to the housing inlet 52. In the example shown, the outlet conduits 98, 100 both lead to the same housing inlet 52 and are coupled to a T-shaped connector 102, although different housing inlets for each conduit could be provided, if desired. Further, the housing inlet 52 could be lead to an internal passage of the housing 18 that is branched or forked to lead to different locations within the housing 18, to distribute lubricant as desired with respect to internal components like bearings, seals and gears.

The first outlet 90 may have a smaller flow area than the second outlet 92. The second outlet 92 may define a maximum liquid level in the reservoir 80 in that, in many operating conditions, liquid will exit the reservoir 80 through the second outlet 92 before the liquid level is able to rise above the level of the second outlet 92. The upwardly directed outlet(s) 54 of the housing 18 enables the reservoir 80 to be located above the outlet(s) 54 (relative to gravity) and facilitates return of lubricant to the housing interior 32 under the force of gravity through the housing inlet(s) 52 which may be located below the reservoir 80 (relative to gravity).

An effective volume of the reservoir 80 is defined between the bottom wall 94 and the second outlet 92, and is less than the volume of lubricant within the housing 18 when no lubricant is within the reservoir 80 (i.e. the total or maximum volume of lubricant in the system). The distance of the second outlet 92 to the bottom 94 of the reservoir 80 defines this volume, and this volume may be selected to ensure that sufficient lubricant remains in the housing interior 32 when higher liquid levels are needed in the housing 18, while also permitting a reduction in liquid volume in the housing 18 when less lubricant is needed in the housing 18. At higher rotary speeds of the drive shaft 14 and ring gear 20, more lubricant may be routed out of the housing 18 and to the reservoir 80 to reduce resistance to rotation and to avoid energy losses. At higher rotary speeds, lubricant is more easily displaced within the housing 18 and more easily reaches spaced apart components that need lubrication. Thus, it may be desirable to have a lower volume of lubricant within the housing 18 when the ring gear 20 is rotating at higher speeds. At lower rotary speeds, less liquid in the housing 18 can make it difficult to lubricate various components within the housing 18. Thus, a greater volume of lubricant in the housing interior 32 may be desired at lower rotary speeds, to facilitate lubricating components in the housing 18. With the outlet(s) 54 oriented upwardly, and with the outlets 54 located at or above the level of the ring gear 20 axis, less or no lubricant will be forced through the outlet(s) 54 at lower rotational speeds.

Directional terms used in this disclosure, like above, below, upward, downward and the like, are made with reference to an orientation of the drivetrain assembly when installed on a vehicle. That is, the orientation of its intended use. This orientation is generally shown in the drawings for the illustrated embodiment(s).

What is claimed is:

1. A vehicle drivetrain assembly, comprising:
   a housing having a housing interior, a housing inlet communicating with the housing interior, a housing outlet communicating with the housing interior, and an opening communicating with the housing interior and adapted to receive part of a shaft;
   a reservoir carried by the housing and having a reservoir interior, a reservoir inlet communicating with the reservoir interior, and at least one reservoir outlet communicating with the reservoir interior; and
   a conduit coupled at a first end to the housing outlet and coupled at a second end to the reservoir inlet, wherein at least part of the conduit extends above the housing interior relative to gravity, and the conduit is routed about an exterior of the housing.

2. The assembly of claim 1 wherein the housing outlet extends from a first end to a second end at an angle of between 20 degrees and 90 degrees relative to an axis of the opening.

3. The assembly of claim 1 wherein the housing outlet has a first end that is open to the housing interior and a second end, the first end is between the housing interior and the second end, and the first end is below the second end relative to gravity when the housing is in an orientation of its intended use.

4. The assembly of claim 3 wherein the housing outlet is located above an axis of the opening when the housing is in an orientation of its intended use and relative to gravity.

5. The assembly of claim 1 wherein the housing includes a base in which the opening is formed and a cover coupled to the base, with the base and cover both defining part of the housing interior, and wherein the housing outlet is defined in the cover.

6. The assembly of claim 1 wherein the at least one reservoir outlet includes a first outlet formed in a bottom of the reservoir, and a second outlet located above the bottom of the reservoir, and wherein a flow area of the second outlet is greater than a flow area of the first outlet.

7. The assembly of claim 6 wherein the reservoir interior is located above at least part of the housing interior relative to gravity when the housing is in an orientation of its intended use.

8. The assembly of claim 1 wherein the reservoir inlet is located above said at least one reservoir outlet relative to gravity when the housing is in an orientation of its intended use.

9. A vehicle drivetrain assembly, comprising:
- a housing having a housing interior part of which defines a lubricant bath in which lubricant is received, a housing inlet communicating with the housing interior, a housing outlet communicating with the housing interior, a first opening communicating with the housing interior and having a first axis, a second opening communicating with the housing interior and having a second axis, and a third opening communicating with the housing interior and being coaxial with the second opening;
- a reservoir carried by the housing and having a reservoir interior, a reservoir inlet communicating with the reservoir interior, and at least one reservoir outlet communicating with the reservoir interior;
- a conduit coupled at a first end to the housing outlet and coupled at a second end to the reservoir inlet, wherein at least part of the conduit extends above the housing interior relative to gravity, and the conduit is routed about an exterior of the housing; and
- a ring gear received within the housing interior for rotation relative to the housing, the ring gear is arranged so that part of the ring gear is within the lubricant bath and lubricant is displaced by the ring gear as the ring gear rotates relative to the housing and at least some of the displaced lubricant is routed from the housing interior to the reservoir interior through the lubricant conduit.

10. The assembly of claim 9 wherein the housing outlet extends from a first end to a second end at an angle of between 20 degrees and 90 degrees relative to the first axis, and the first end is open to the housing interior and the second end, the first end is between the housing interior and the second end, and the first end is below the second end relative to gravity when the housing is in an orientation of its intended use.

11. The assembly of claim 10 wherein the housing outlet is located above an axis of the first opening when the housing is in an orientation of its intended use and relative to gravity.

12. The assembly of claim 10 wherein an acute included angle is defined between: 1) a centerline of a passage between the first end and second end of the outlet; and 2) a radius extending from the second axis and intersecting the centerline at the first end of the outlet.

13. The assembly of claim 10 wherein an imaginary plane drawn perpendicular to the second axis intersects both a portion of a periphery of the ring gear and the housing outlet.

14. The assembly of claim 10 wherein a flow area of the first end of the housing outlet is greater than a flow area of the second end of the housing outlet.

15. The assembly of claim 9 wherein the housing includes a base in which the first opening, second opening and third opening are formed and a cover coupled to the base, with the base and cover both defining part of the housing interior, and wherein the housing outlet is defined in the cover.

16. The assembly of claim 9 wherein the at least one reservoir outlet includes a first outlet formed in a bottom of the reservoir, and a second outlet located above the bottom of the reservoir, and wherein a flow area of the second outlet is greater than a flow area of the first outlet.

17. The assembly of claim 16 wherein the reservoir interior is located above at least part of the housing interior relative to gravity when the housing is in an orientation of its intended use.

18. The assembly of claim 9 wherein the reservoir inlet is located above said at least one reservoir outlet relative to gravity when the housing is in an orientation of its intended use.

\* \* \* \* \*